A. J. THALMAN & A. A. HART.
KETTLE COVER AND ATTACHMENT.
APPLICATION FILED MAY 17, 1915.

1,173,989.

Patented Feb. 29, 1916.

WITNESSES:
L. J. Forde
Thos Castberg

INVENTORS.
Andrew J. Thalman
Albert A. Hart.
BY G. H. Strong.
ATTORNEY

THE COLUMBIA PLANOGRAPH CO., WASHINGTON, D. C.

UNITED STATES PATENT OFFICE.

ANDREW J. THALMAN AND ALBERT A. HART, OF RICHMOND, CALIFORNIA.

KETTLE-COVER AND ATTACHMENT.

1,173,989.  Specification of Letters Patent.  Patented Feb. 29, 1916.

Application filed May 17, 1915. Serial No. 28,515.

*To all whom it may concern:*

Be it known that we, ANDREW J. THALMAN and ALBERT A. HART, citizens of the United States, residing at Richmond, in the county of Contra Costa and State of California, have invented new and useful Improvements in Kettle-Covers and Attachments, of which the following is a specification.

This invention relates to improvements in kettles having a closable top and cover, such as tea-kettles and like.

The invention consists of an eccentrically located open filling member, rising from one side of the hemispherically niched permanent top, and out of the pivot lines of the swinging handle or bail, a cover hinged parallel with and contiguous to the bail pivot line, and a link connecting the outer swinging edge of the cover, with the central handle portion of the bail, by the turning of which from a vertical to a horizontal position, the cover may be opened, and closed by a reverse movement of the bail.

It also comprises details of construction which will be more fully explained by reference to the accompanying drawings in which—

Figure 1:
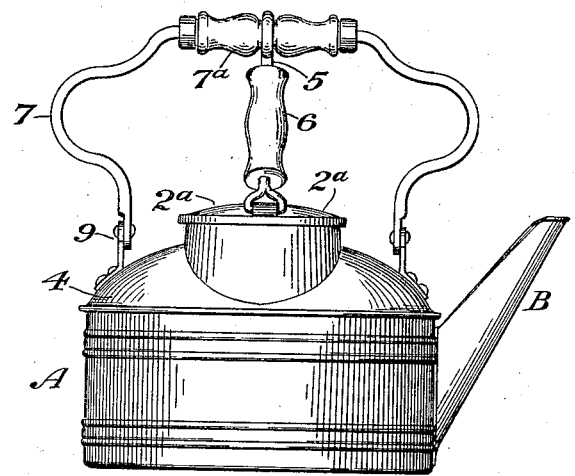
Figure 2:
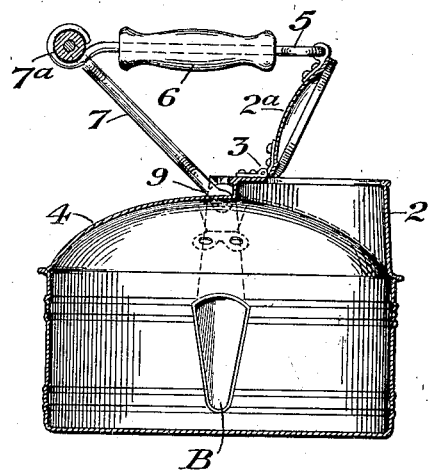

Figure 1 is a view of the kettle, and attachment with the cover closed. Fig. 2 is a vertical section with the cover open.

As shown in the drawing, A is a kettle having a permanently closed and sealed arched top 4, and a pouring spout B projecting from one side. At one side of this top and having a cover $2^a$ hinged to its upper end at the inner edge thereof, as shown at 3, is a tubular filling member 2; the cover being adapted to open from its outer edge.

7 is a bail pivoted in a line transverse to the center of the top, as at 9, and having a non-heat conducting handle $7^a$ in the center.

5 is a connecting rod or link, the outer end of which is pivotally connected with the outer portions of the hinged cover $2^a$, and the inner end of which is bent to clasp and be turnable about the handle $7^a$. Within the length of the link is a non-heat conducting handle 6 by which this cover may be opened or closed independent of the connection with the bail. When the cover is closed, the bail stands upright, and when the bail is turned down to lie upon the side of the top opposite to the cover section, it will act through the link to open the cover.

The advantage of this construction is, first, the tubular member 2 being located close to the inside of the kettle allows any sediment or scale which may accumulate therein to be poured out easily and without obstruction, such as is found when the cover is located in the center of the top; and second, the connecting link enables the two handles 6 and $7^a$ to be used together to hold the cover open while the kettle is tilted to remove its contents through this opening. This location of the opening and cover out of line with the bail diverts rising steam away from the handle and protects the hand of the user.

Having thus described our invention, what we claim and desire to secure by Letters Patent is—

1. A kettle including a body having a filling member at one side thereof, a lid for said member, a bail hinged to the body and a link pivoted to the center of the bail and to the lid, said link and the bail center in one position thereof and when the lid is open being each disposed in a plane parallel to the bottom of the body so that both the bail center and link may serve as handles for the kettle.

2. A kettle including a body having a tubular member at one side of the center of the body, a hinged lid on said member, a bail connected to the body, and a connection between the bail and lid, said link when the lid is closed being disposed at an angle to the plane of the body bottom and in one position thereof and when the lid is open being disposed in a plane parallel to the body bottom so as to provide a handle which is supplemental to the handle that the bail provides.

3. In combination with a kettle having a top opening, a hinged lid for said opening, a bail hinged to the kettle and having a hand gripping part and a link connected to the bail and to said lid and having a hand gripping part, said hand gripping parts in one position and when the lid is open being disposed in a plane substantially parallel to the kettle bottom so that each of said hand gripping parts may be utilized in manipulating the kettle.

In testimony whereof we have hereunto set our hands in the presence of two subscribing witnesses.

ANDREW J. THALMAN.
ALBERT A. HART.

Witnesses:
H. A. HENNEBERGER,
WM. E. CASE.

Copies of this patent may be obtained for five cents each, by addressing the "Commissioner of Patents. Washington, D. C."